United States Patent
Lin et al.

(10) Patent No.: US 11,248,813 B2
(45) Date of Patent: Feb. 15, 2022

(54) WALL-MOUNTED SUCTION VENTILATOR

(71) Applicants: Jason Lin, Fremont, CA (US);
Jianfang Lin, Jiangmen (CN)

(72) Inventors: Jason Lin, Fremont, CA (US);
Jianfang Lin, Jiangmen (CN)

( * ) Notice: Subject to any disclaimer, the term of this patent is extended or adjusted under 35 U.S.C. 154(b) by 0 days.

(21) Appl. No.: 15/732,342

(22) Filed: Oct. 26, 2017

(65) Prior Publication Data

US 2018/0119968 A1 May 3, 2018

Related U.S. Application Data

(60) Provisional application No. 62/496,736, filed on Oct. 28, 2016.

(51) Int. Cl.
*F24F 7/00* (2021.01)
*B60H 1/24* (2006.01)
*F24F 13/06* (2006.01)

(52) U.S. Cl.
CPC .............. *F24F 7/00* (2013.01); *B60H 1/243* (2013.01); *B60H 1/248* (2013.01); *F24F 13/06* (2013.01); *F24F 2007/0025* (2021.01)

(58) Field of Classification Search
USPC ........ 454/33, 35, 38, 39, 52; 138/39, 44, 97, 138/98, 111, DIG. 11; 52/95, 199, 218, 52/220.1, 220.8, 302.1, 302.3
See application file for complete search history.

(56) References Cited

U.S. PATENT DOCUMENTS

| 787,267 | A | * | 4/1905 | Bragg | F24F 7/02 126/307 R |
| 3,774,645 | A | * | 11/1973 | Pompa | F16L 55/00 138/44 |
| 4,080,883 | A | * | 3/1978 | Zink | F23G 7/085 110/184 |
| 4,281,592 | A | * | 8/1981 | Maxson | F24F 13/26 137/889 |
| 5,158,328 | A | * | 10/1992 | Anderson | D06F 58/20 285/144.1 |
| D800,174 | S | * | 10/2017 | Ghalsasi | D15/5 |

(Continued)

FOREIGN PATENT DOCUMENTS

| GB | 190929054 A | * | 6/1910 | ................ F24F 7/00 |
| JP | 2009133592 A | * | 6/2009 | |

(Continued)

*Primary Examiner* — Steven B McAllister
*Assistant Examiner* — Charles R Brawner

(57) ABSTRACT

A natural ventilator is herein disclosed that is free of moving parts, wind-activated, rain-proof, and free of dust or smog infiltration. It is not only suitable to be a standalone natural ventilator, but is also advantageous to be used as an enhanced exhaust exit in a forced-air ventilation system, for such enclosed spaces or objects as buildings and vehicles needing air relief. The ventilator assembly has rainwater-proof shapes or fixtures that serve to defend the vent system, and the interior space being vented, against rainwater invasion, even if raindrop trajectory becomes highly oblique from vertical as driven by strong winds. It also includes shapes or fixtures to prevent fume condensation from drifting outward and staining the exterior of a building or vehicle, or the like, that is being vented.

7 Claims, 11 Drawing Sheets

(56) References Cited

U.S. PATENT DOCUMENTS

| | | | |
|---|---|---|---|
| 2005/0054281 A1* | 3/2005 | Lin | B60H 1/248 |
| | | | 454/116 |
| 2006/0005479 A1* | 1/2006 | Jones | E04D 5/14 |
| | | | 52/199 |
| 2010/0120352 A1* | 5/2010 | Lynch | E04B 1/7076 |
| | | | 454/271 |

FOREIGN PATENT DOCUMENTS

| | | | | |
|---|---|---|---|---|
| JP | 2009133592 A1 * | 6/2009 | | F24F 7/04 |
| WO | WO-0142717 A1 * | 6/2001 | | E04B 1/7076 |

* cited by examiner

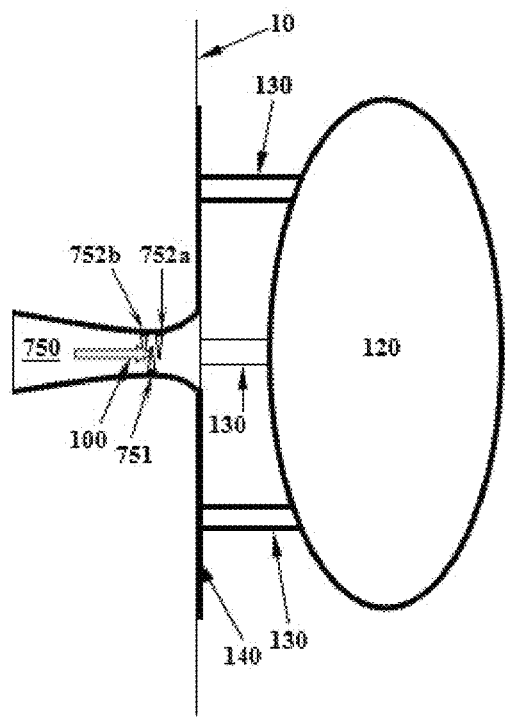
Fig. 7
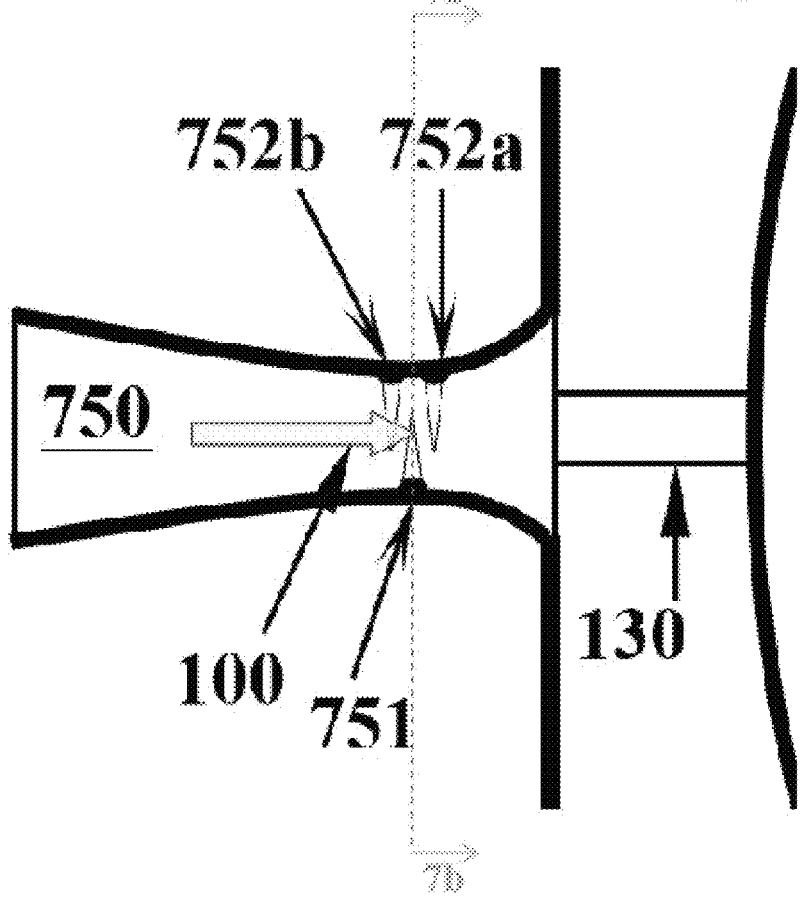
Fig. 7a
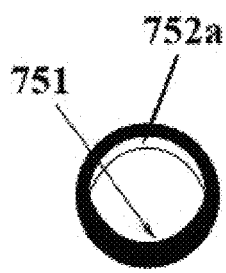
Cross-Section 7b

WALL-MOUNTED SUCTION VENTILATOR

CROSS-REFERENCE TO RELATED APPLICATIONS

This application is entitled to the benefit of Provisional Patent Application Ser. No. 62/496,736, filed 2016 Oct. 28.

BACKGROUND

Field of Invention

This invention relates to an improved air exhaust system, which can be utilized in the field of building and vehicle ventilation.

Discussion of Prior Art

U.S. Pat. Nos. 4,223,486; 4,557,081; and 4,888,930 to T. L. Kelly, Waterbury, Conn. taught a method to equalize or balance the uplift on the upper surface of roof membranes by channeling the negative pressure therein to underneath the membrane, as well as to aid venting out moisture there under.

That method, while intended to tap the negative pressures that occur above the roof, has the potential to actually feed positive pressure into underneath the membrane, enhancing the uplift force so as to worsen the situation. This is because of the fact that the wind flow on the roof is highly turbulent and complex, frequently deviating from the situation the Kelly equalizer system is designed for. The method is also not suitable for wall-mounted applications. Particularly in wall edge areas the airflow is dominated by strong, fluctuating and intermittent vortices. Pressures therein fluctuate significantly from negatives to positives as evidenced in wind tunnel and field test data. Positive pressure will completely counter Kelly's intention with his device. Although the Kelly method also includes a valve intended to "prevent" any positive pressures from entering into underneath the membrane, the air tightness of the contracted valve sleeves is hardly sufficient to block out the infiltration of positive pressures. Such additional mechanism also complicates the system, increases the probability or chances of component and system failure, and raises the cost of the system as well.

In the field of building and vehicle ventilation, a number of designs exist for aiding air exhaust or air relief, for example, U.S. Pat. Nos. 6,582,291 B2; 6,302,778 B1; 5,326,313; 4,379,972; 4,086,028; and 3,952,638 to various inventors. However, none provides a simple and effective method. Most of them involve complicated and expensive moving parts such as turbines, fans and associated bearings etc., which also increase the chances of mechanical failure.

U.S. Pat. Nos. 7,001,266; 4,963,761; 4,603,619; 4,534,119; 3,509,811; 3,382,792; 3,347,147; 3,345,931; 2,387,708; and 211,872 to various inventors disclosed ventilators utilizing venturi effects; however, the disclosed configurations are all vulnerable to rainwater infiltration into the interior, and are complicated and lead to higher material and fabrication costs.

U.S. Pat. No. 7,065,271 to Lin, U.S. patent application Ser. No. 11/177,492 of Jones et.al, and Ser. No. 12/101,625 of Lin disclosed ventilators that resolve rainwater infiltration concerns by using complicated air path with multiple turns, but such methods have also compromised highly-desired aerodynamic effectiveness for ventilation, as well as led to still relatively higher material and fabrication costs.

SUMMARY OF THE INVENTION

With a direct gas exit, along with new rainwater-proof mechanisms, the present invention provides a simpler roof-mounted gas exhaust device, or so-called suction ventilator, that is foolproof in ensuring "negative pressure" or suction at the exit under any external flow condition, which can be used for aiding air relief or ventilation in buildings, other enclosed facilities, vehicles or trailers. The external flow causing the suction can be from natural wind or due to the motion of a vehicle, on which the suction ventilator is installed.

By disposing the ventilator's exit opening or openings towards a contracted free space between a base body and a raised body, a venturi effect is created at the opening under natural wind where low-pressure, or so-called suction, draws air from inside the exit and into the external wind flow to be carried away. The faster the wind flow is, the lower the pressure becomes at the exit opening and the stronger the suction effect.

The ventilator disclosed herein has a direct gas exit without multiple turns of gas conduit, reducing drag to the gas flow and improving the ventilator's effectiveness, while still possessing a rainwater-proof property.

The low pressure generated at the exit opening is significantly lower than the internal pressure inside a building, vehicle, or compartments therein, and other enclosed objects or units, under essentially all external wind conditions. This effect lends the ventilator a functionality of aiding air exhaust, natural or forced, for the ventilation of spaces in buildings, enclosed facilities, vehicles or other enclosed objects and units that are connected to the ventilator. The ventilator disclosed herein is improved for forced air exhaust because it facilitates direct air exit without multiple turns of air conduits such that it presents less drag to air flow, while maintaining a rainwater-proof property.

The designs disclosed herein provide for a suction ventilator that effectively prevents rainwater from infiltrating into the interior, even if raindrop trajectory becomes highly oblique from vertical as driven by strong winds.

OBJECTS AND ADVANTAGES

Accordingly, several objects and advantages of the present invention are:

to provide a foolproof air exhaust ventilator that ensures "negative pressure" or suction at the gas exit under any external flow condition for improved air relief in buildings, enclosed facilities, vehicles, trailers or other such enclosed objects and units;

to provide a ventilator of zero energy consumption that uses only external natural wind energy;

to provide a device that obviates any moving parts, such as turbine, fan or bearing etc., which are expensive and often represent the sources of mechanical failure and render an exhaust system malfunctioned, and thus represents a reliable and durable device of low cost, low maintenance, low failure probability, long life expectance and no mechanical noise;

to provide a device that has relatively simple configuration and the ease to manufacture and install, whereas is still among the most effective and efficient;

to provide a ventilator that is rainwater-proof, smog-proof and dust-proof, while having a direct exhaust exit to reduce drag to gas flow and increase effectiveness, efficiency and thus usefulness;

to provide a ventilator that is most suitable to be mounted on a substantially vertical surface as situation requires;

Further objects or advantages are to provide a ventilator that is among the simplest, most lightweight, most inexpensive to manufacture and convenient to install, no troublesome moving parts, zero energy consumption but high exhaust efficiency, rain and smog infiltration proof. These and still further objects and advantages will become apparent from a consideration of the ensuing description and drawings.

BRIEF DESCRIPTION OF THE DRAWINGS

FIG. 7 shows an exemplary configuration modified from that in FIG. 6 according to the present invention.

FIG. 7a shows a partial view of the device in FIG. 7, to present an enlarged detail view of a lower divider ridge and upper drip edges within a conduit.

DESCRIPTION OF THE PREFERRED EMBODIMENTS

Figure 1:
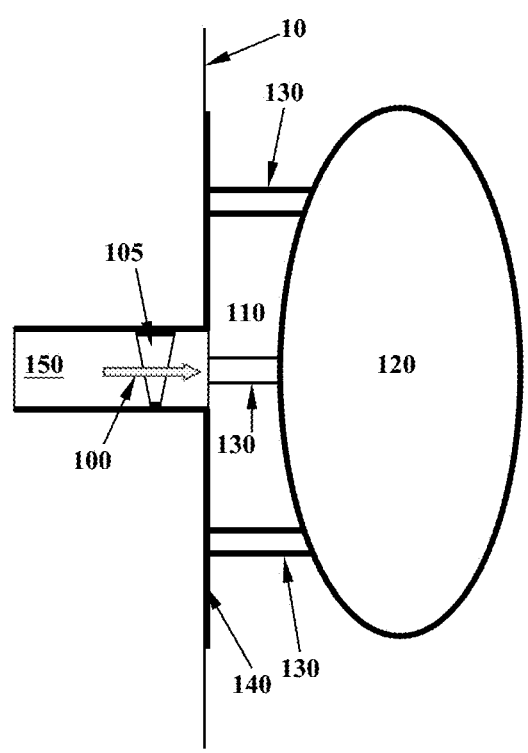
FIG. 1 schematically illustrates one of the preferred basic configurations according to the present invention.

FIG. 1 illustrates one of the preferred basic configurations of the present invention, for a side view as being mounted to an exterior wall surface 10. A raised body 120 is supported with a plurality of elongated members 130 onto a base plate 140, which is attached and secured onto the exterior wall surface 10 with any appropriate means. The raised body 120 has a convex surface facing the base plate 140, such that a free space 110 between them is narrower near its center than toward its outer perimeter, forming an airflow path that first contracts and then expands under any approaching wind direction. The base plate 140 has an opening approximately at its center forming an exit of a tube or tunnel 150 that penetrates the wall and channels the spaces inside and outside a wall enclosure. The number and size of the support members 130, hollow or solid, should be sufficient to support the raised body 120 but not be excessive to over-occupy the free space 110 formed between the raised body 120 and the base plate 140. When external airflow passes the free space, which may be caused by wind or by a moving vehicle, it accelerates while approaching the center of the free space so that the pressure therein becomes negative relative to the ambient pressure as governed by Bernoulli principle, called venturi effect. The higher the wind speed, the stronger the negative pressure will be. This negative pressure, or so-called suction, induces a secondary flow 100 through the tunnel 150 and its exit towards the free space 110, providing constant exhaust from an interior space within the wall enclosure under any possible ambient or external wind speed and direction. This suction can be channeled, with any appropriate means such as a conventional duct or conduit, to a specific space in a building, vehicle or trailer, for example, a kitchen, bathroom or lavatory therein, for ventilation purposes, improving air flux. This is applicable not only as a standalone method of natural ventilation, but also in mechanically forced ventilation scenarios. Examples of such forced ventilation scenarios include kitchen range hoods and bathroom fans, where a device of this invention is used as the exhaust exit of such ventilation system, enhances the exhaust efficiency with its suction mechanism described above, and prevents air backflow under any possible ambient wind speed and direction whether the system's mechanical forcing such as a fan is on or off. The raised body 120 and supports 130 are preferably hollow to save material and reduce weight of the system; however, it can also be solid without affecting their respective functionalities, when system weight and material cost are lesser an issue than other such factors as manufacture complexity, for example, when using certain lightweight synthetic material.

An optional ring-like liner 105 can be fitted or mounted into the tube/tunnel 150 as shown in FIG. 1, to stop rainwater from drifting through the tunnel 150 into an interior space being vented via the device, and to prevent unsightly residual fume condensation, deposited on the inner portion of the tunnel 150, from drifting outwards to the exterior wall surface. One of the preferred shapes of such liner 105 (or liners) is as shown in FIG. 1, which functions as double drip edges and, by having a wider top and a narrower bottom, ensures any rainwater dripping from the outer drip edge of the liner being kept outside and any fume condensation dripping from the inner edge being kept inside where fume condensation is normally more convenient to clean than that on an exterior wall. Other liner shapes are possible according to the spirit of this invention.

Figure 1A:
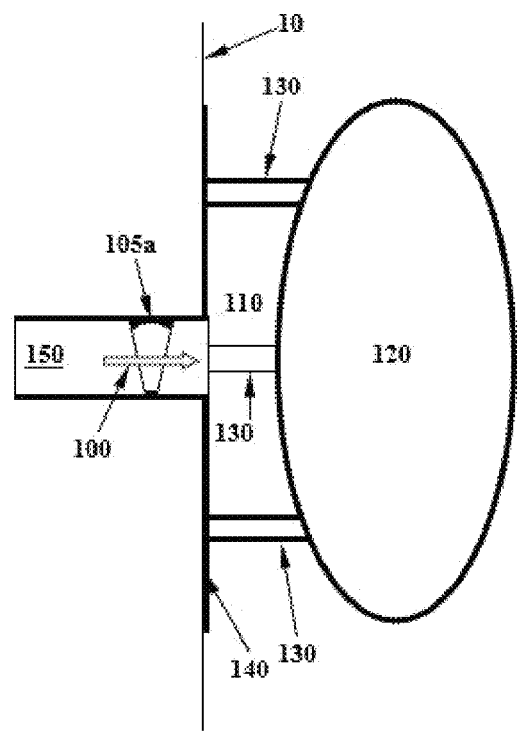
FIG. 1a shows a slight modification to the configuration on the rain-proof mechanism according to the present invention.
Figure 1B:
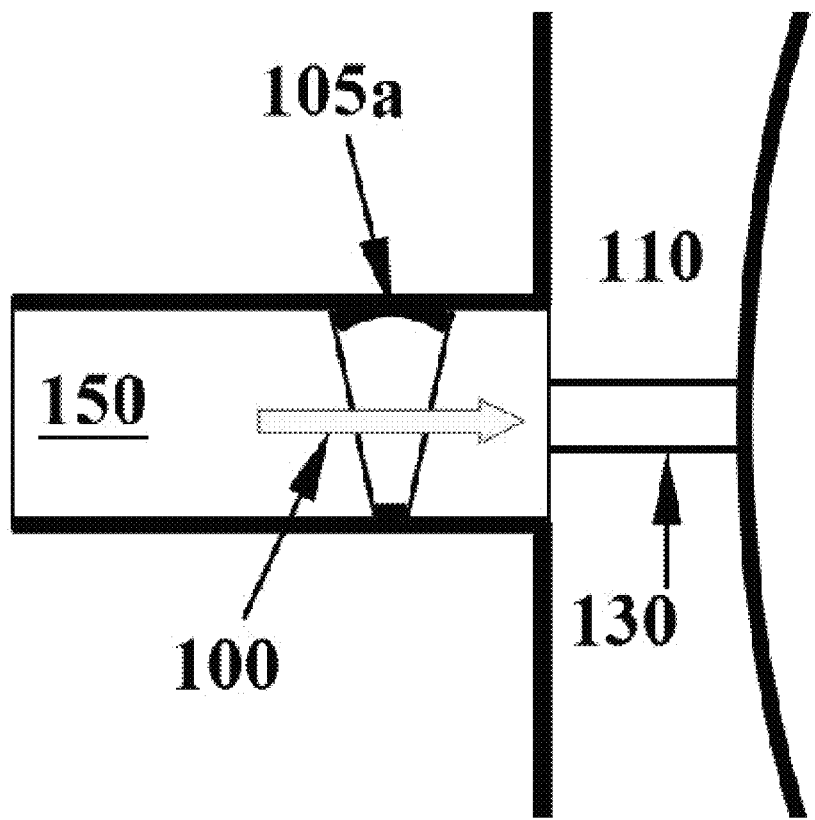
FIG 1b shows a partial view of the device in FIG. 1a, to present an enlarged detail view of a tubular liner inside a conduit.

FIG. 1a shows a slightly modified shape of the liner 105a, having an arched upper portion that enhances the liner's functionality as double drip edges to prevent rainwater from drifting inwards and unsightly fume condensation from drifting outwards.

Figure 2:
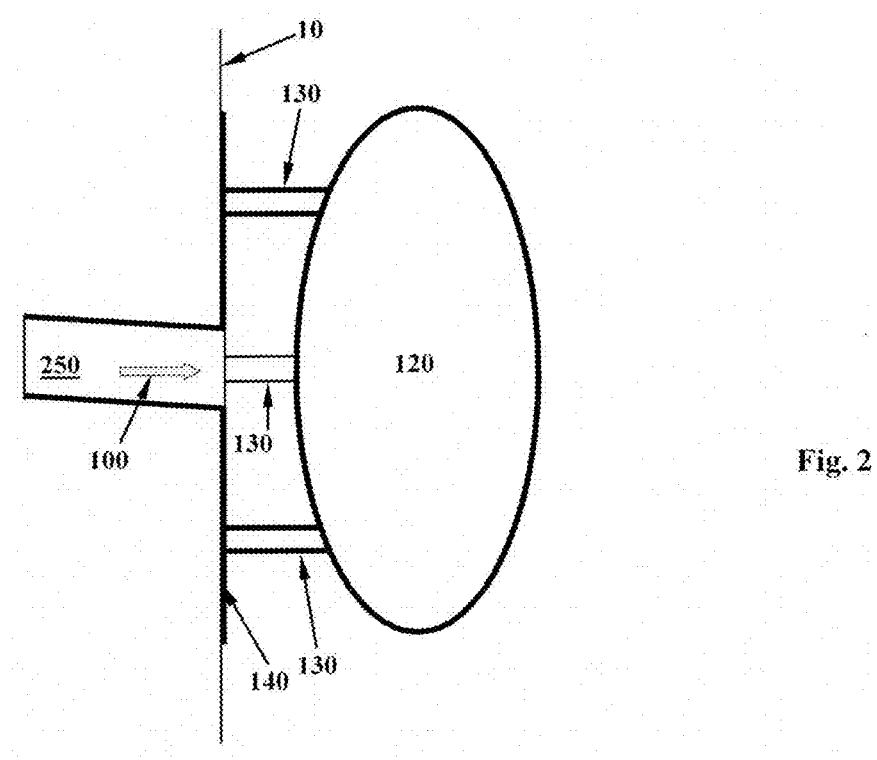
FIG. 2 illustrates another of the preferred basic configurations according to the present invention.

FIG. 2 shows an alternative configuration for preventing rainwater from drifting inwards, where the tunnel 250 is sloped to shed liquids outwardly. This alternative tunnel configuration is not recommended for use in such situation as a kitchen or a range hood in kitchen, where heavy fume condensation may occur in the tunnel 250, since condensed fume droplets may drift outwards over time to reach and stain the exterior wall surface.

Figure 3:
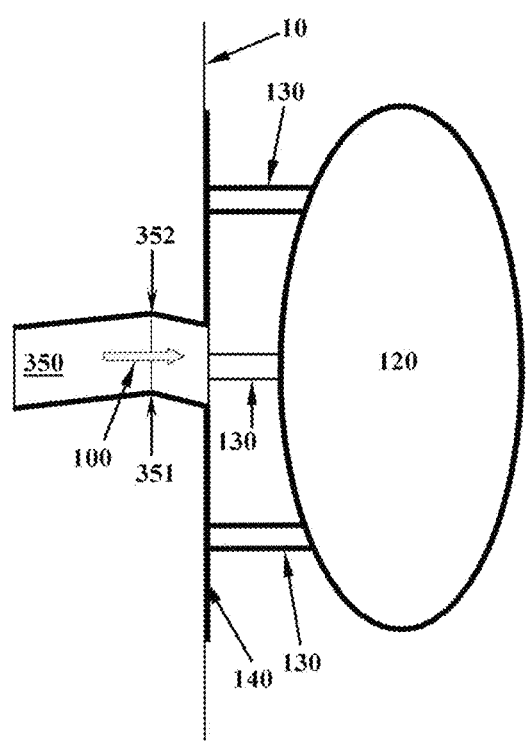
FIG. 3 shows an exemplary modification to the configuration in FIG. 2 according to the present invention.

FIG. 3 shows another alternative configuration for preventing rainwater from drifting inwards and unsightly fume condensation from drifting outwards, where the tunnel 350 is sloped to shed liquids outwardly on its outer portion and inwardly on its inner portion.

Figure 4:
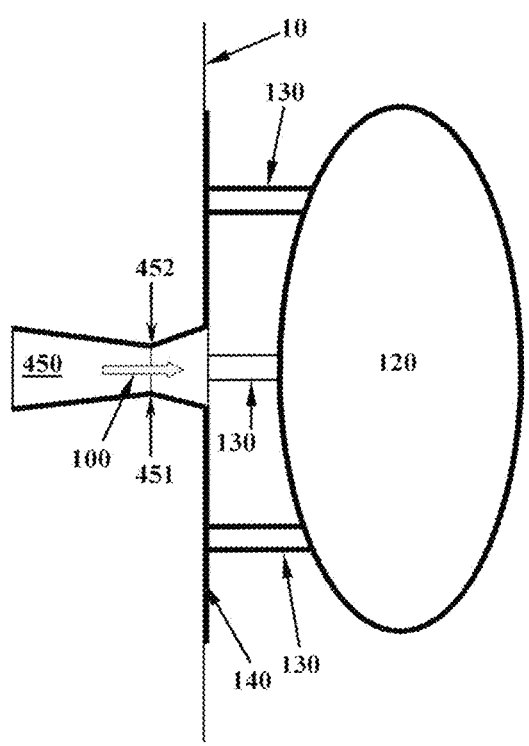
FIG. 4 shows an alternative configuration according to the present invention.

FIG. 4 provides another alternative configuration for preventing rainwater from drifting inwards and fume condensation from drifting outwards, where the bottom of the tunnel 450 is sloped to shed liquids outwardly on its outer portion and inwardly on its inner portion. A single drip edge 452 is formed at the upper part of the joint of the two portions that helps stop any rainwater invaded on the upper tunnel wall from drifting further inwards or any residual fume condensation from drifting further outwards.

Figure 4A:
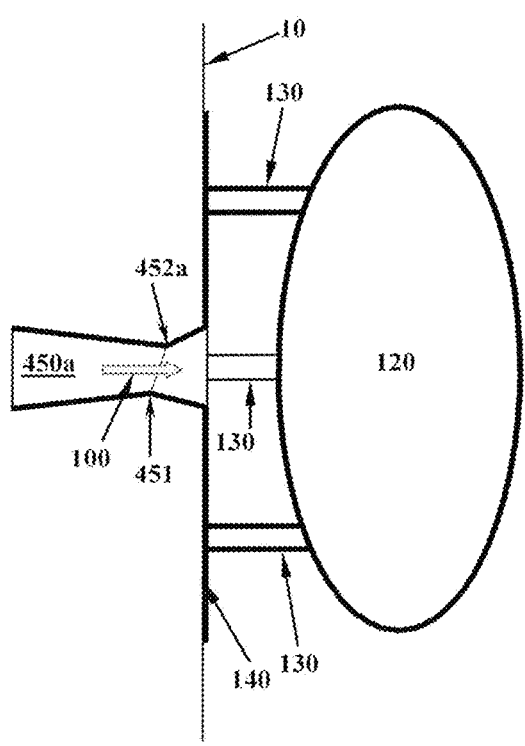
FIGS. 4a and 4b illustrate modifications to the configuration in FIG. 4 according to the present invention.

FIG. 4a provides a modified configuration better for preventing rainwater from drifting inwards, where the drip edge 452a is formed and skewed outwardly to ensure that rainwater will not drip into the inner portion of the tunnel 450a.

Figure 4B:
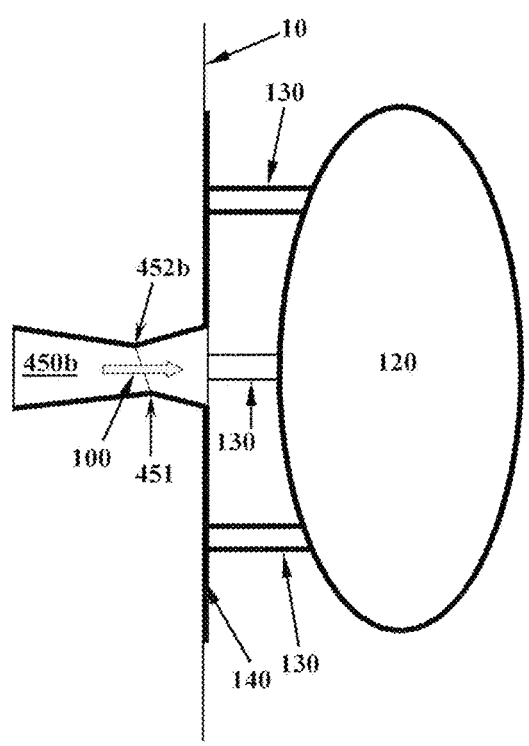

FIG. 4b provides another modified configuration better for limiting fume condensation from drifting outwards, where the drip edge 452b is formed and skewed inwardly to ensure that fume deposit will not drip into the outer portion of the tunnel 450b.

Figure 5:
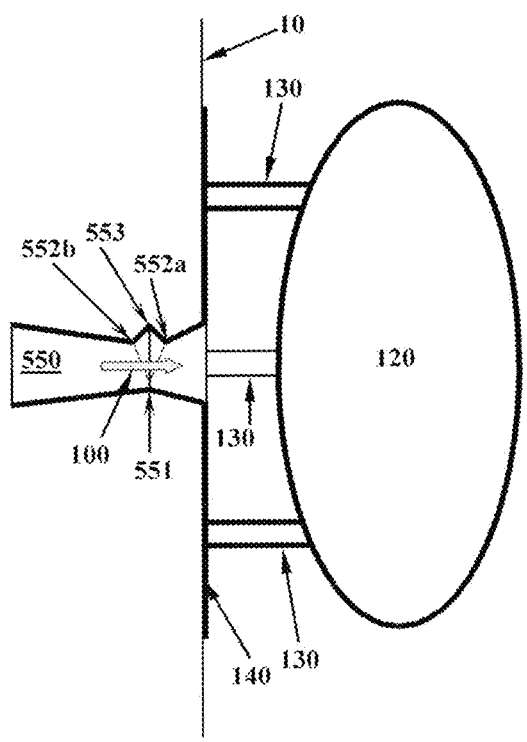
FIG. 5 shows another alternative rain-proof mechanism that is a combination of those in FIGS. 4a and 4b according to the present invention.

FIG. 5 provides a further modified configuration better for both preventing rainwater from drifting inwards and limiting fume condensation from drifting outwards, where two drip edges 552a and 552b are formed and skewed inwardly and outwardly respectively to ensure that no or little liquid drips into a wrong side of the ridge 551 in the tunnel 550.

Figure 6:
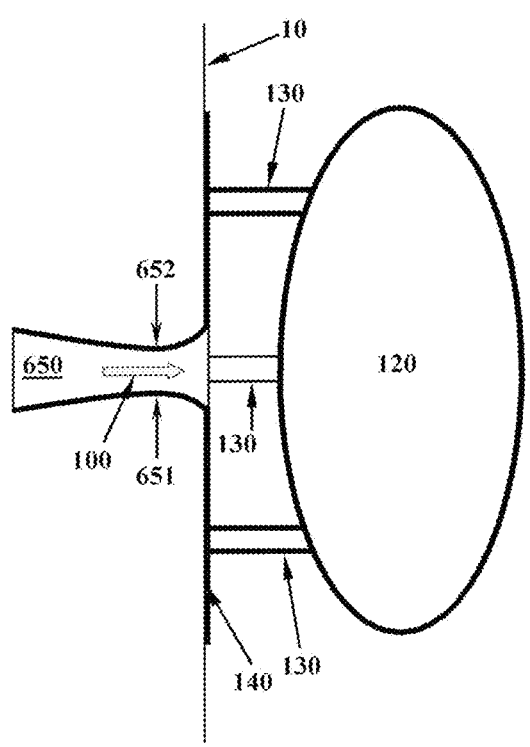
FIG. 6 shows further another embodiment according to the present invention.

FIG. 6 shows another design of the tunnel 650, similar to the tunnel shown in FIG. 4 but with a curved tunnel wall. The lower wall surface of the tunnel 650 is curved down in both directions from the ridge point 651 to shed rainwater outwardly on its outer portion, and unsightly condensation inwardly on its inner portion. The lowest portion 652 of the upper wall surface helps stop any rainwater invaded on the upper wall from drifting further inwards, or any residual fume condensation from drifting further outwards. A better option for restricting rainwater, similar to that in FIG. 4a, is to position the low point 652 of the upper surface in FIG. 6 further outward, relative to the ridge point 651 of the lower surface. On the other hand, similar to that in FIG. 4b, a variation better for confining fume condensation is to position the low point 652 of the upper surface in FIG. 6 further inward relative to ridge point 651.

In FIG. 7, upper drip edges 752a and 752b, which are ring-like convex ribs circling about half of the upper wall of the tunnel 750 and preferably slightly beyond, and a lower divider ridge 751, circling about half of the lower wall of the tunnel 750 and preferably slightly beyond, are added to form an alternative tunnel configuration 750. Such a design ensures that no liquid drips into a wrong side of the divider ridge 751.

The specific shapes shown in the previous figures for the raised body and other elements of the suction ventilator are merely used as examples to assist in illustrating the general conception. Variations are allowable for their shapes, such as modifications to the ratio of height to width, or aspect ratio, of the raised body. Specific choices of cross-sectional shape, length and diameter of the tunnel, as well as those of the elongated supports for the raised body, are also allowable according to the situation of application as desired and appropriate according to the spirit described herein.

Figure 8:
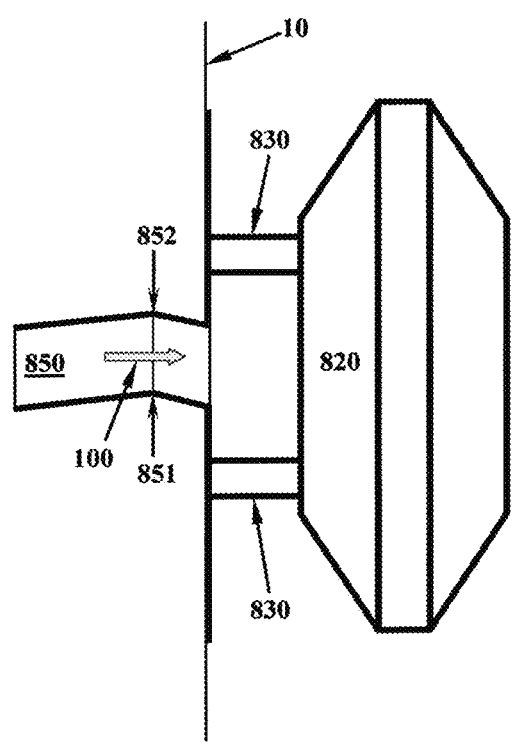
FIG. 8 shows an embodiment of the present invention for a suction ventilator that consists mainly of plane surfaces.

For example, configurations primarily comprising plane surface are acceptable. FIG. 8 shows an example of such alternative configurations. The raised body 820 is formed of multiple plane surfaces. The respective cross-sectional shapes of the tunnel 850 and elongated supports 830 can be square or rectangular.

Other aesthetically pleasing or appealing modifications to the shape of the raised body are allowable in principle as long as such modifications will not jeopardize or significantly compromise its aerodynamic functionality, for which its general shape that has a convex surface facing the tunnel exit should be substantially maintained. Non-smooth surface, for example, roughened, corrugated or ribbed, can be utilized for the raised body, for whatever purposes—architectural, aerodynamic such as for flow separation control or airflow guide etc., or any others, as long as such local additions do not significantly alter the general shape of a convex surface facing the tunnel exit.

Optional removable or fixed screens may be installed on any suitable location in the tunnel, for example the tunnel 850 in FIG. 8, to prevent flying insects or small birds from invading the system or an interior space being vented.

Installation and Operation

In principle, the suction ventilator described herein is functional anywhere on a vertical or near-vertical exterior surface of the building or vehicle where there are relative air movements, such as those caused by wind or by a moving vehicle, although there are optimal locations where installed suction ventilators will function most effectively. Generally, these locations are near edges and corners, where airflow velocity is normally the highest and local ambient air pressure is lowest most of the time.

Suction ventilators described in this application are passive, flow-activated devices.

Once installed properly, they stay operating and functioning as wind blows, and require no active intervention. The stronger the wind blows, the more effective the suction ventilator is. Since there is no moving part involved in the entire system, minimal or no maintenance is required. Routine cleaning may be needed in situations with heavy fume condensation, mostly for the portions of the system reachable from inside a building or vehicle without the need for specialty cleaning equipment.

Conclusion, Ramifications, and Scope

It is apparent that suction ventilators of this invention provide an air or gas exhaust system that is aerodynamically advantageous, energy conserving, rainwater-proof and fume condensation reducing, and is still among the simplest, most inexpensive to manufacture and convenient to install. Unlike other ventilation options, such as exhaust fans or turbine vents, it involves no moving part or mechanism, so that it also possesses many additional qualities desired of a ventilator, including extremely low maintenance, essentially unlimited life expectancy, noise-free operation, and so on.

Although the description above contains many specifications, these should not be construed as limiting the scope of the invention but as merely providing illustrations of some of the presently preferred embodiments of this invention. Various changes, modifications, variations can be made therein without departing from the spirit of the invention. For example, the outer perimeter edge of the raised body can be a sharp edge, instead of being a blunt edge as shown for all the above given examples. The suction ventilators can be made of any reasonably durable material with any appropriate means of fabrication as long as a configuration according to the spirit of this invention is accomplished to support the described working mechanism and to provide the associated functionality. Various surface portions of a suction ventilator may also be roughened or bear such surface details as corrugation or ribs of adequate sizes, as opposed to perfectly smooth surfaces. Any appropriate conventional or new surface-mounting method can be used to secure a suction ventilator to a vertical or near-vertical surface without departing from the spirit of this invention. Thus the scope of the invention should be determined by the appended claims and their legal equivalents, rather than by the examples given.

What we claim as my invention is:

1. A ventilation device to be capable of being mounted onto a vertical exterior surface of an enclosed object to be vented, comprising:
    a base plate having at least one aperture;

a tube connected to said base plate in fluid communication with said aperture to allow for free movement of gases through connected assembly of said tube and said base plate, said assembly of tube and said base plate having geometry and/or fixture forming at least one of a first mechanism stopping rainwater from drifting inwards and a second mechanism stopping fume condensation from drifting outwards;

a raised body having a convex face towards said aperture of said base plate, and supported and secured on said base plate with a plurality of elongated members, forming a free space between said convex face and said base plate;

wherein said free space being narrower near said aperture than away from said aperture, forming a first contracting and then expanding path for external wind flow approaching from any direction and passing through said free space between said convex face and said base plate, whereby to create a low air pressure or a venturi suction effect at said aperture, said suction effect being communicated to an interior space of said enclosed object to be vented through said aperture and said tube;

wherein at least one tubular liner attached onto internal surface of said tube, said tubular liner being shorter than said tube, configured to be recessed from both ends of said tube and concealed within said tube, whereby as said first mechanism to stop rainwater from drifting inwards and as said second mechanism to stop fume condensation from drifting outwards along said internal surface of said tube.

2. The device of claim 1, wherein said tubular liner having an upper portion wider in said tube's axial direction than a lower portion, therein as double drip edges to ensure rainwater droplets to fall to an outer portion of said tube and fume droplets to fall to an inner portion of said tube, said outer portion and said inner portion of said tube being separated by said lower portion of said tubular liner.

3. The device of claim 2, wherein said upper portion of said tubular liner having an inner wall surface curving downwardly in opposite directions toward said inner portion and said outer portion of said tube, forming lowest points at inner and outer edges therein, whereby to enhance functionality as double drip edges.

4. A ventilation device to be capable of being mounted onto a vertical exterior surface of an enclosed object to be vented, comprising:
a base plate having at least one aperture;
a tube connected to said base plate in fluid communication with said aperture to allow for free movement of gases through connected assembly of said tube and said base plate, said assembly of tube and said base plate having geometry and/or fixture forming at least one of a first mechanism stopping rainwater from drifting inwards and a second mechanism stopping fume condensation from drifting outwards;

a raised body having a convex face towards said aperture of said base plate, and supported and secured on said base plate with a plurality of elongated members, forming a free space between said convex face and said base plate;

wherein said free space being narrower near said aperture than away from said aperture, forming a first contracting and then expanding path for external wind flow approaching from any direction and passing through said free space between said convex face and said base plate, whereby to create a low air pressure or a venturi suction effect at said aperture, said suction effect being communicated to an interior space of said enclosed object to be vented through said aperture and said tube;

wherein an outer portion of said tube expanding outwardly, and an inner portion of said tube expanding inwardly, a juncture of said inner and said outer portions forming at least one narrow section of said tube, an upper portion of said narrow section being configured to have at least one drip edge and a lower portion of said narrow section being configured to have at least one dividing ridge, at least one said drip edge being positioned away from said dividing ridge in said tube's axial direction, therein as said first mechanism to stop rainwater from drifting inwards or as said second mechanism to stop fume condensation from drifting outwards, wherein said dividing ridge dividing said tube into said inner and said outer portions.

5. The device of claim 4, wherein said drip edge being positioned to the outer side of said dividing ridge, whereby to function as said first mechanism by preventing drifting rainwater from falling onto said inner portion of said tube.

6. The device of claim 4, wherein said drip edge being positioned to the inner side of said dividing ridge, whereby to function as said second mechanism by preventing drifting fume condensation from falling onto said outer portion of said tube.

7. The device of claim 4, wherein said at least one narrow section comprises a first narrow section and a second narrow section wherein said first narrow section and said second narrow section meet at said dividing ridge.

* * * * *